United States Patent
Hebert et al.

(10) Patent No.: US 7,248,364 B2
(45) Date of Patent: Jul. 24, 2007

(54) APPARATUS AND METHOD FOR OPTICAL CHARACTERIZATION OF A SAMPLE OVER A BROADBAND OF WAVELENGTHS WITH A SMALL SPOT SIZE

(75) Inventors: Ray Hebert, Los Gatos, CA (US); Marc Aho, Aptos, CA (US); Abdul Rahim Forouhi, Cupertino, CA (US)

(73) Assignee: n&k Technology, Inc., Santa Clara, CA (US)

(*) Notice: Subject to any disclaimer, the term of this patent is extended or adjusted under 35 U.S.C. 154(b) by 370 days.

(21) Appl. No.: 10/741,294

(22) Filed: Dec. 19, 2003

(65) Prior Publication Data

US 2005/0134847 A1 Jun. 23, 2005

(51) Int. Cl.
*G01J 4/00* (2006.01)
(52) U.S. Cl. ..................................... 356/369
(58) Field of Classification Search ........ 356/364–369, 356/445
See application file for complete search history.

(56) References Cited

U.S. PATENT DOCUMENTS

| | | | |
|---|---|---|---|
| 4,595,288 A * | 6/1986 | Rambauske | 356/124 |
| 4,645,349 A | 2/1987 | Tabata | |
| 5,096,298 A | 3/1992 | Isobe | |
| 5,106,196 A * | 4/1992 | Brierley | 356/445 |
| 5,141,312 A * | 8/1992 | Thompson et al. | 356/218 |
| 5,166,752 A | 11/1992 | Spanier et al. | |
| 5,181,080 A | 1/1993 | Fantom et al. | |
| 5,241,366 A | 8/1993 | Bevis et al. | |
| 5,329,357 A | 7/1994 | Bernoux et al. | |
| 5,493,443 A * | 2/1996 | Simon et al. | 359/368 |
| 5,607,800 A | 3/1997 | Ziger | |
| 5,608,526 A | 3/1997 | Piwonka-Corle et al. | |
| 5,739,909 A | 4/1998 | Blayo et al. | |
| 5,747,813 A | 5/1998 | Norton et al. | |
| 5,867,276 A | 2/1999 | McNeil et al. | |
| 5,880,838 A | 3/1999 | Marx et al. | |
| 5,910,842 A | 6/1999 | Piwonka-Corle et al. | |
| 5,917,594 A * | 6/1999 | Norton | 356/327 |
| 5,963,329 A | 10/1999 | Conrad et al. | |
| 5,991,022 A | 11/1999 | Buermann et al. | |
| 6,128,085 A | 10/2000 | Buermann et al. | |
| 6,137,570 A | 10/2000 | Chuang et al. | |
| 6,184,984 B1 | 2/2001 | Lee et al. | |
| 6,310,687 B1 | 10/2001 | Stumbo et al. | |
| 6,323,946 B1 | 11/2001 | Norton | |
| 6,429,943 B1 | 8/2002 | Opsal et al. | |
| 6,462,817 B1 | 10/2002 | Strocchia-Rivera | |
| 6,483,580 B1 | 11/2002 | Xu et al. | |
| 6,515,744 B2 | 2/2003 | Wei | |

(Continued)

*Primary Examiner*—Gregory J. Toatley, Jr.
*Assistant Examiner*—Isiaka O. Akanbi
(74) *Attorney, Agent, or Firm*—Lumen Intellectual Property Services, Inc.

(57) ABSTRACT

An apparatus and method for optically characterizing the reflection and transmission properties of a sample with a beam of light having a small diameter on a surface of the sample over a broadband of wavelengths, from 190 nm to 1100 nm. Reflective optical components, including off-axis parabolic mirrors with a collimated incident or reflected broadband beam of light, minimize non-chromatic aberration. The apparatus and method further disclose an optical light path that can be focused by adjusting the position of an off-axis parabolic mirror and a planar mirror.

34 Claims, 6 Drawing Sheets

U.S. PATENT DOCUMENTS 6,583,877 B2 6/2003 Norton
6,587,282 B1 7/2003 Wang et al.
6,611,330 B2 8/2003 Lee et al.
2002/0008874 A1 1/2002 Lee et al.
2006/0001883 A1* 1/2006 Brill et al. .................. 356/445

* cited by examiner

APPARATUS AND METHOD FOR OPTICAL CHARACTERIZATION OF A SAMPLE OVER A BROADBAND OF WAVELENGTHS WITH A SMALL SPOT SIZE

CROSS-REFERENCE TO RELATED APPLICATIONS

The present application is co-filed with application "Apparatus and Method for Optical Characterization of a Sample Over a Broadband of Wavelengths While Minimizing Polarization Changes" by Ray Hebert, Marc Aho and Abdul Rahim Forouhi, which is herein incorporated by reference.

FIELD OF THE INVENTION

The present invention relates generally to an apparatus and method for optically characterizing the properties of a sample on reflection and transmission of light over a broadband of wavelengths with a small spot size on a surface of the sample.

BACKGROUND OF THE INVENTION

Advances in microelectronics necessitate components with ever smaller critical dimensions. Manufacturing such components requires the use of shorter wavelengths of light in the lithography processes employed in component fabrication. This, in turn, has lead to a need to measure the optical characteristics of samples such as, among other, photolithographic masks and fabricated components over a broad range or band of wavelengths including the UV. Typically, in these measurements the cross-sectional diameter of a beam of light focused on the sample is large enough to spatially average the optical characteristic being measured yet small enough to resolve spatial variations across the sample. As the critical dimensions have decreased so too has the required diameter of the beam of light on the sample. It is now desirable to have a diameter of less than 100 micron.

As with many engineering problems, the design of an optical system to measure the optical characteristics of such a sample represents a tradeoff. For example, when illuminating the beam of light with the broadband of wavelengths from a light source onto a surface of the sample, it is desirable to have a small spot size but not a diffraction limited spot. In addition, this should be accomplished in an optically efficient manner. There is, therefore, a tradeoff in this regard between a need for optical components with a low f-number (for higher optical efficiency) and a need for optical components with a high f-number (for a small spot size over a practical depth of field with minimal aberration and angles of incidence) and thus a small cone of rays corresponding to the beam of light that is used in the optical system, i.e., the useful light. Similar design tradeoffs occur in the collection and illumination on a detector of the beam of light reflected from the sample and the beam of light transmitted through the sample.

The need to operate over the broadband of wavelengths is a further design constraint for many optical components because they are subject to a variety of effects such as chromatic aberration and absorption. For refractive optical components these effects become pronounced as the wavelengths approach the UV. There exist optical systems based on refractive optical components in the prior art that operate over a broadband of wavelengths with a small diameter of the beam of light on the sample. In these systems, attempts are made to compensate for chromatic aberration and absorption effects. However, this adds expense and complexity to these optical systems.

Reflective optical components are a suitable solution to this technical challenge. A wide variety of components are available including mirrors with non-spherical shape, such as an off-axis paraboloid shape, henceforth called an off-axis parabolic mirror. However, non-spherical shaped mirrors can add expense to the optical system, especially when such mirrors are manufactured by diamond turning. Optical systems including torroidal, spherical and elliptical mirrors are disclosed in the prior art. For examples, see U.S. Pat. Nos. 5,910,842, 6,583,877 and 6,128,085.

In addition, many prior art broadband optical systems combine refractive and reflective optical components. However, such catadioptric systems do not avoid the complexity and expense needed to overcome the chromatic aberration and absorption issues associated with refractive optical components.

Furthermore, when different samples are characterized, the beam of light in the optical system will need to be focused on the sample to correct for effects such as varying surface topography. Such an adjustment is problematic if the adjustment of the position of certain optical components in the optical system necessitates the adjustment of the position of many other optical components, since this can easily lead to misalignment. A preferred solution would allow the beam of light to be focused on the sample by adjusting a minimum number of components in the optical system or a simple assembly of components. Furthermore, such a preferred solution would be a sufficiently compact and simple optical system that a single light source could be used to optically characterize the reflection and transmission properties of the sample.

There is a continued need, therefore, for a compact optical system for optical characterization of a sample, which operates over a broadband of wavelengths with a small diameter of the beam of light on the sample and which employs reflective optics with a minimum number of optical components such that advantageous components such as off-axis parabolic mirrors can be used. There is also a need for such an optical system that can be focused by adjusting the position of the minimum number of optical components or a simple assembly of components.

OBJECTS AND ADVANTAGES

In view of the above, it is a primary object of the present invention to provide an apparatus and method that enables optical characterization of the properties of a sample on reflection and transmission of a beam of light over a broadband of wavelengths with a small spot size on the surface of the sample. More specifically, it is an object of the present invention to provide a broadband apparatus with a small spot size on the surface of the sample, and a method of using this apparatus, for optical characterization of the properties of the sample on reflection and transmission of the beam of light through the use of optical light paths comprising reflective optical components, including off-axis parabolic mirrors. It is a further object of the present invention to provide an apparatus, and a method of using this apparatus, where the spot size on the surface of the sample can be brought into focus without extensive adjustment of the position of these optical light paths.

These and numerous other objects and advantages of the present invention will become apparent upon reading the following description.

SUMMARY

The objects and advantages of the present invention are secured by an apparatus and method for the optical characterization of the properties of a sample on reflection and transmission of a beam of light, with a small spot size on the sample, over a broadband of wavelengths. A broadband beam of light from a light source is fractionally magnified and illuminated onto a top surface of the sample. A portion of the broadband beam of light is reflected from the top surface of the sample, a portion of the broadband beam of light is transmitted through the sample and a portion of the broadband beam of light is absorbed. The portion of the broadband beam of light reflected from the top surface of the sample is redirected and illuminated onto a first detector. The portion of the broadband beam of light transmitted through the sample is redirected from a bottom surface of the sample and illuminated onto a second detector. These functions are accomplished using an illumination optical light path, a reflection optical light path and a transmission optical light path, each of which comprises reflective optical components, thereby eliminating chromatic aberrations from these components. Pairs of planar and off-axis parabolic mirrors are used to redirect and magnify the broadband beam of light. In a preferred embodiment, the planar and off-axis parabolic mirrors are coated with a UV-enhancing aluminum coating. The broadband beam of light in the illumination optical light path, the reflection optical light path and the transmission optical light path is collimated between the pair of parabolic mirrors in each optical light path. This configuration allows focusing of the broadband beam of light on the top surface of the sample by adjusting a position of one of the pairs of planar and off-axis parabolic mirrors without requiring adjustment of the position of other components in each of the optical light paths.

In another embodiment of this invention, an optical fiber is used to redirect the portion of the broadband beam of light transmitted through the sample to illuminate the second detector.

In another embodiment of this invention, a polarizing means is incorporated into at least one of the optical light paths to adjust the polarization of the broadband band beam of light.

In another embodiment of this invention, the portion of the broadband beam of light reflected from the sample and the portion of the broadband beam of light transmitted through the sample are each redirected and illuminated onto a common detector.

A detailed description of the invention and the preferred and alternative embodiments is presented below in reference to the attached drawing figures.

DETAILED DESCRIPTION OF THE EMBODIMENTS

Figure 1:
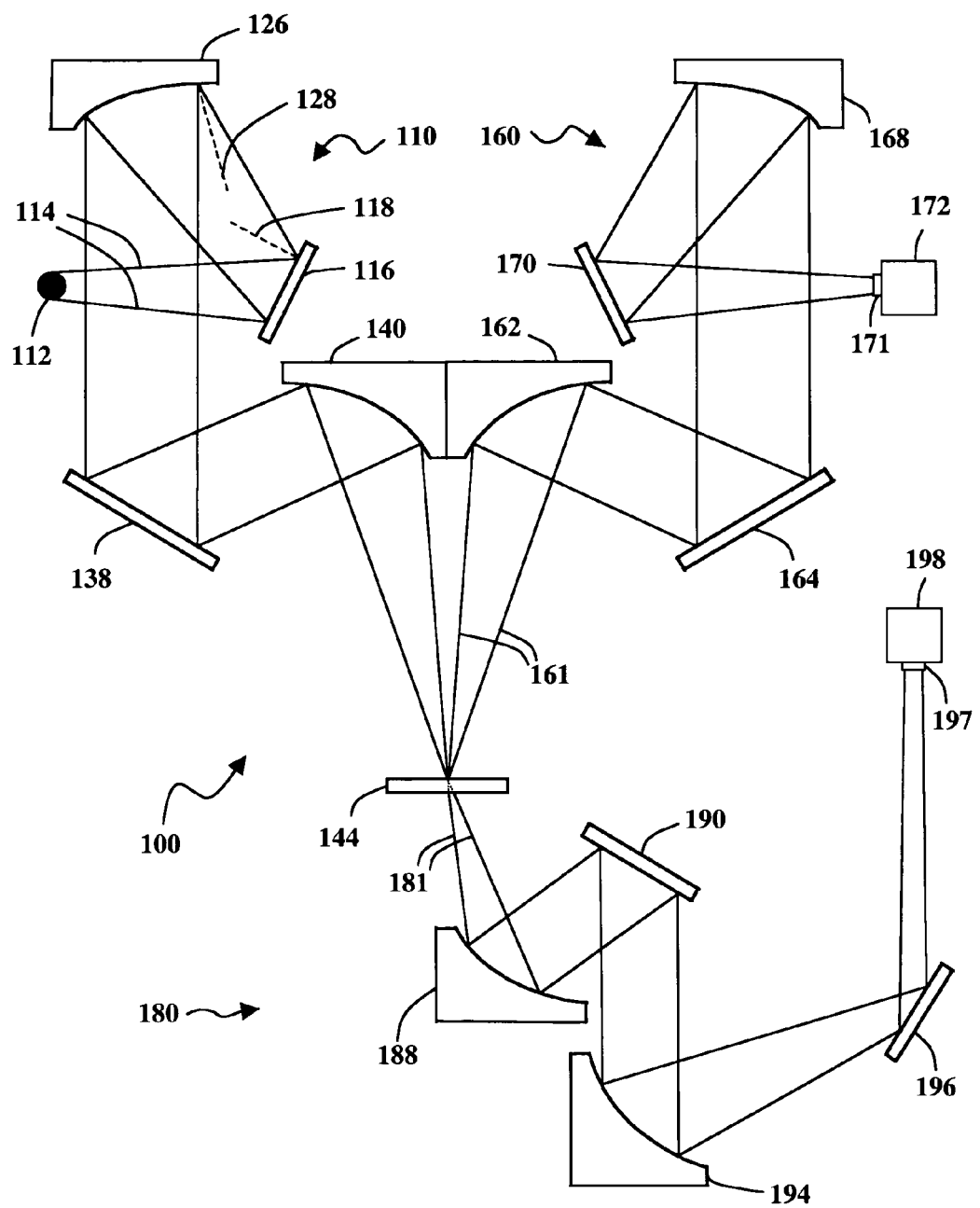
FIG. 1 is a diagram illustrating an apparatus according to the invention.

A preferred embodiment of the invention is illustrated in FIG. 1. An apparatus 100 according to the invention comprises a first optical light path 110, a second optical light path 160 and a third optical light path 180. A light source 112 produces a broadband beam of light 114 between 190 nm and 1100 nm (broadband beam of light 114 is identified by its extremal rays in FIG. 1). An arc source, such as a Hamamatsu L2-2000 series deuterium lamp, is suitable for the UV portion of the spectrum, and a tungsten lamp for the visible and IR portions of the spectrum. A combination of the deuterium lamp and the tungsten lamp is suitable as the light source 112. The broadband beam of light 114 is redirected on reflection off of a first planar mirror 116. A model 01-MGF-005/028 planar mirror from Melles-Griot is suitable as the planar mirror 116. The first planar mirror 116 is positioned relative to a first off-axis parabolic mirror 126 such that the broadband beam of light 114 is collimated on reflection from the first off-axis parabolic mirror 126. A suitable off-axis parabolic mirror can be custom manufactured by Edmond Industrial Optics using diamond turning. A commercially available example of such an off-axis parabolic mirror is model H47-085 from Edmond Industrial Optics.

The broadband beam of light 114 is redirected on reflection off of a second planar mirror 138. The broadband beam of light 114 incident and reflected off of the second planar mirror 138 is collimated. The second planar mirror 138 is positioned relative to a second off-axis parabolic mirror 140 such that the broadband beam of light 114 illuminates and is brought into focus on a sample 144.

Figure 5:
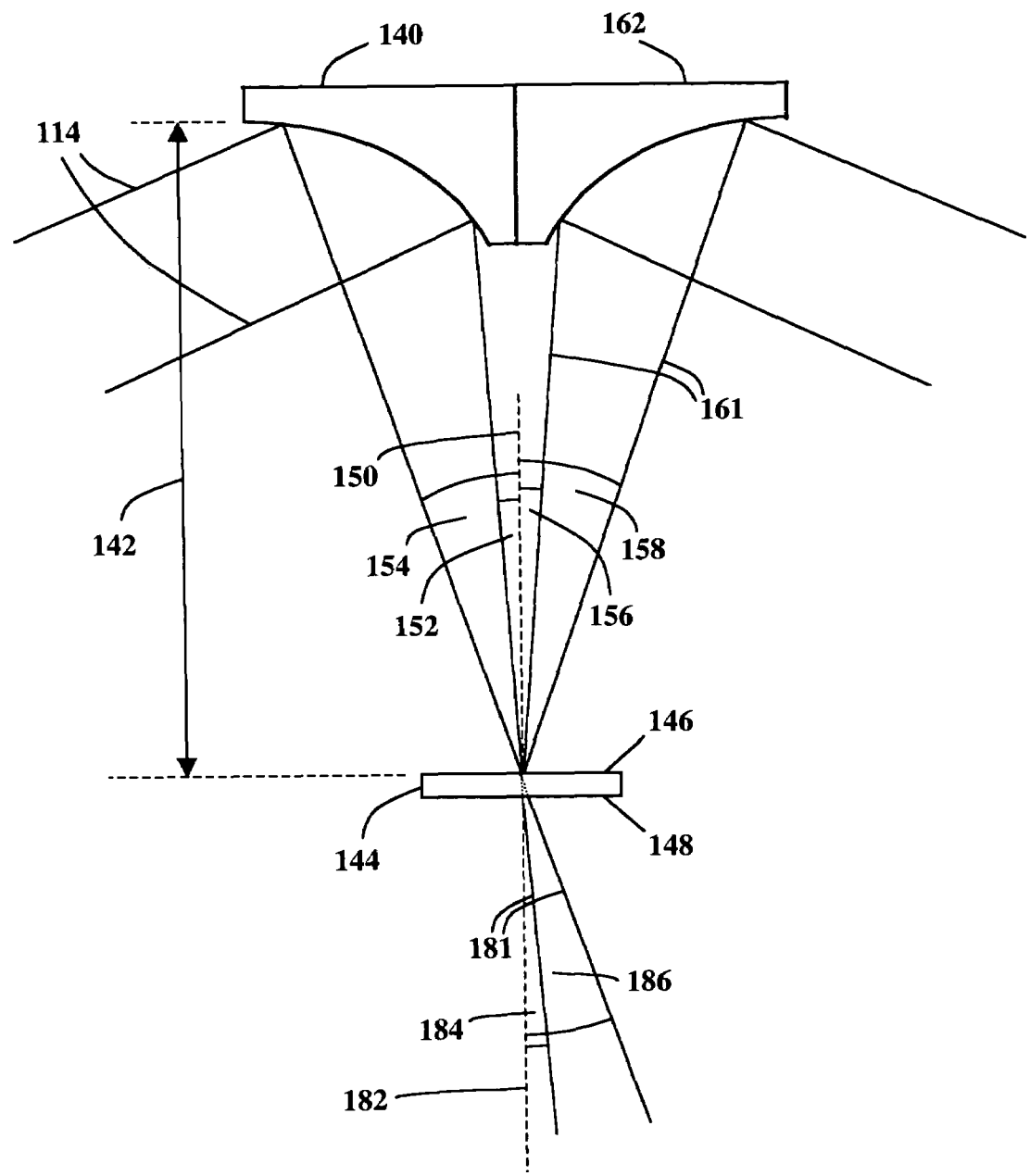
FIG. 5 is a diagram illustrating the focusing of the broadband beam onto the sample surface.

Referring to FIG. 5, the broadband beam of light 114 is collimated when incident on the second off-axis parabolic mirror 140. This ensures that the broadband beam of light 114 will come to focus at a distance 142 from the second off-axis parabolic mirror 140. There is a known relationship between the distance 142 and focal length along axis of the second off-axis parabolic mirror 140. A person of skill in the art will be able to determine the focal length from the curvature of the second off-axis parabolic mirror 140. By adjusting the position of the second off-axis parabolic mirror 140 relative to the sample 144, the broadband beam of light 114 is brought into focus on a top surface 146 of the sample 144. It is important, however, that the position of the second planar mirror 138 also be adjusted such that the second planar mirror 138 maintains the same position relative to the second off-axis parabolic mirror 140. In this way, the collimated light reflected off of the second planar mirror 138 remains parallel to the axis (not shown) of the second off-axis parabolic mirror 140. Since the broadband beam of light 114 incident on the second planar mirror 138 is collimated, this adjustment of the position of the second planar mirror 138 and the second off-axis parabolic mirror 140 does not necessitate adjustment of the position of the other components in the first optical light path 110.

Figure 6:
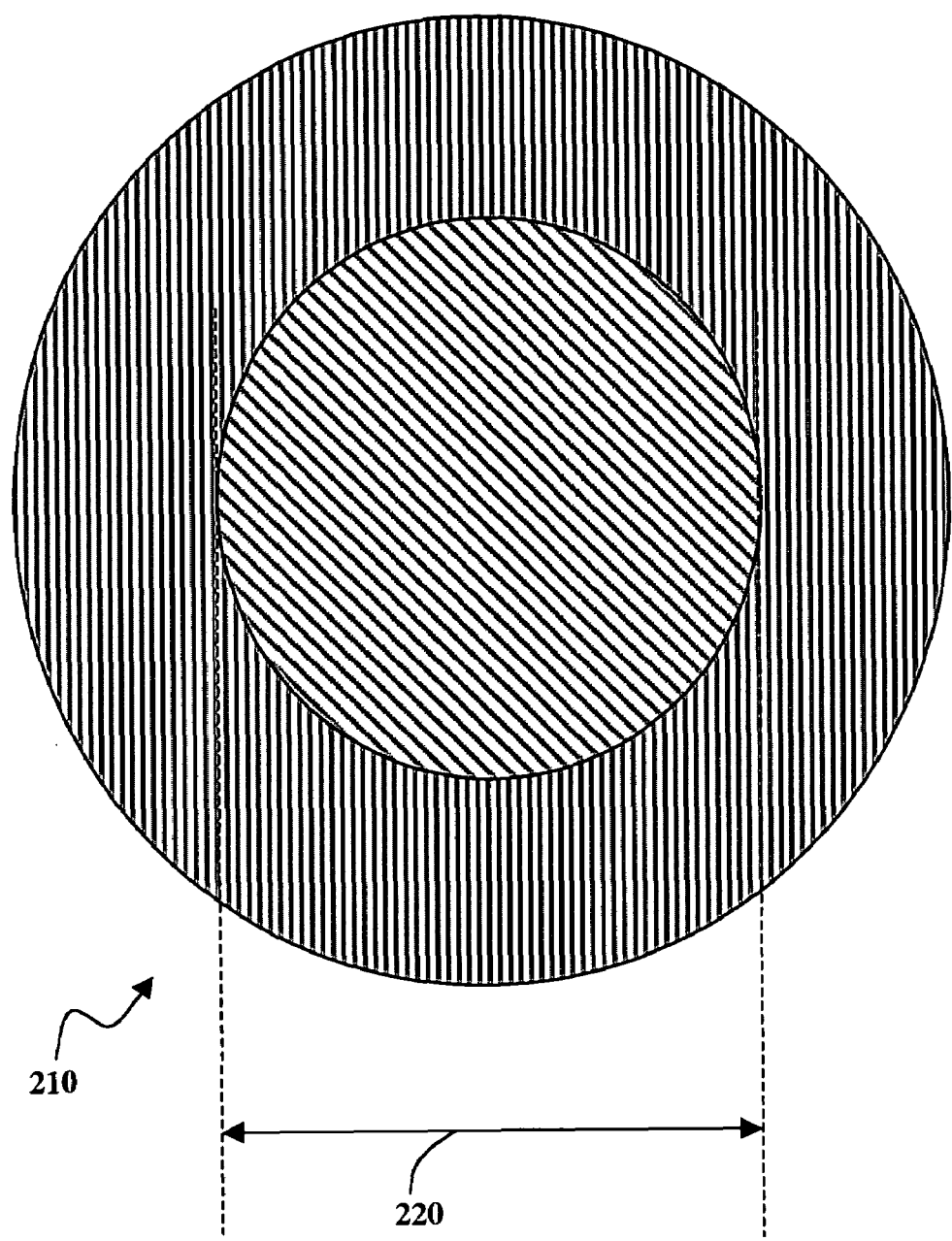
FIG. 6 is a diagram illustrating a cross-sectional view of the broadband beam of light.

Referring to FIG. 6, the broadband beam of light 114 has a cross-section 210 with a diameter 220 defined as twice the distance from the center of the cross-section 210 where the light intensity is reduced by a factor of 1/e. The broadband beam of light 114 has the diameter 220 greater than 500 microns at the light source 112 and the diameter 220 between 50 microns and 80 microns on the top surface 146 of the sample 144.

Referring back to FIG. 5, the small diameter 220 of the broadband beam of light 114 illuminated on the top surface 146 of the sample 144 corresponds to a small spread of angles in the cone of rays in the broadband beam of light 114 incident on the sample 144. The broadband beam of light 114 incident on the top surface 146 of the sample 144 has a minimum angle of incidence 152 and a maximum angle of incidence 154 relative to a normal 150 to the top surface 146 of the sample 144. This reduction is proportional to the ratio of the focal lengths of off-axis parabolic mirror 140 and off-axis parabolic mirror 126.

Referring back to FIG. 1, the broadband beam of light 161 is reflected from the top surface 146 of the sample 144 (broadband beam of light 161 is identified by its extremal rays in FIG. 1). The broadband beam of light 161 is redirected and magnified in the second optical light path 160. The broadband beam of light 161 is redirected on reflection off of a first off-axis parabolic mirror 162 and then redirected on reflection off of a first planar mirror 164. In a manner similar to that used in adjusting the position of second planar mirror 138 and second off-axis parabolic mirror 140 in the first optical light path 110, the position of the first off-axis parabolic mirror 162 and the first planar mirror 164 relative to the top surface 146 of the sample 144 are adjusted such that the broadband beam of light 161 incident and reflected from the first planar mirror 164 is collimated. This ensures that the adjustment of the position of the first off-axis parabolic mirror 162 and the adjustment of the position of the first planar mirror 164 does not necessitate adjustment of the position of other components in the second optical light path 160. Referring back to FIG. 5, the small diameter 220 of the broadband beam of light 114 on the top surface 146 of the sample 144 corresponds to a small spread of angles in the cone of rays in the broadband beam 161 of light with a minimum angle of reflection 156 and a maximum angle of reflection 158.

Referring back to FIG. 1, the broadband beam of light 161 is redirected on reflection off of a second of axis parabolic mirror 168. The broadband beam of light 161 is redirected on reflection off of the second planar mirror 170 and illuminates a first detector 172. The entrance aperture 171 of the first detector 172 is positioned at the focal length of the second off-axis parabolic mirror 168. A person of skill in the art will be able to determine the focal length from the curvature of the second off-axis parabolic mirror 168.

Referring back to FIG. 5, after transmission through the sample 144 the broadband beam of light 181 exits the sample through a bottom surface 148 of the sample 144 (broadband beam of light 181 is identified by its extremal rays in FIG. 5). The cone of rays in the broadband beam of light 181 transmitted through the sample 144 has minimum angle of transmission 184 and maximum angle of transmission 186 relative to a normal 182 to the bottom surface 148 of the sample 144. Referring back to FIG. 1, the broadband beam of light 181 is redirected and magnified by the third optical light path 180. The broadband beam of light 181 is redirected on reflection off of a first off-axis parabolic mirror 188 and then redirected on reflection off of a first planar mirror 190. In a manner similar to that used in adjusting the position of second planar mirror 138 and second off-axis parabolic mirror 140 in the first optical light path 110, the position of the first off-axis parabolic mirror 188 and the first planar mirror 190 relative to the top surface 146 of the sample 144 are adjusted such that the broadband beam of light 181 incident and reflected from the first planar mirror 190 is collimated. This ensures that the adjustment of the position of the first off-axis parabolic mirror 188 and the adjustment of the position of the first planar mirror 190 does not necessitate adjustment of the position of other components in the third optical light path 180. Since the broadband beam of light 114, 161 and 181 is collimated substantially perpendicular to the sample 144 over a portion of the first optical light path 110, the second optical light path 160 and the third optical light path 180, in an embodiment of this invention the adjustment of the second planar mirror 138 and second off-axis parabolic mirror 140, the first off-axis parabolic mirror 162 and the first planar mirror 164, and the first off-axis parabolic mirror 188 and the first planar mirror 190 relative to the top surface 146 of the sample 144 is accomplished with a group of mechanically coupled elements. The broadband beam of light 181 is redirected on reflection off of a second of axis parabolic mirror 194. The broadband beam of light 181 is redirected on reflection off of the second planar mirror 196 and illuminates a second detector 198. The entrance aperture 197 of the second detector 198 is positioned at the focal length of the second off-axis parabolic mirror 194. A person of skill in the art will be able to determine the focal length from the curvature of the second off-axis parabolic mirror 194.

Figure 3:
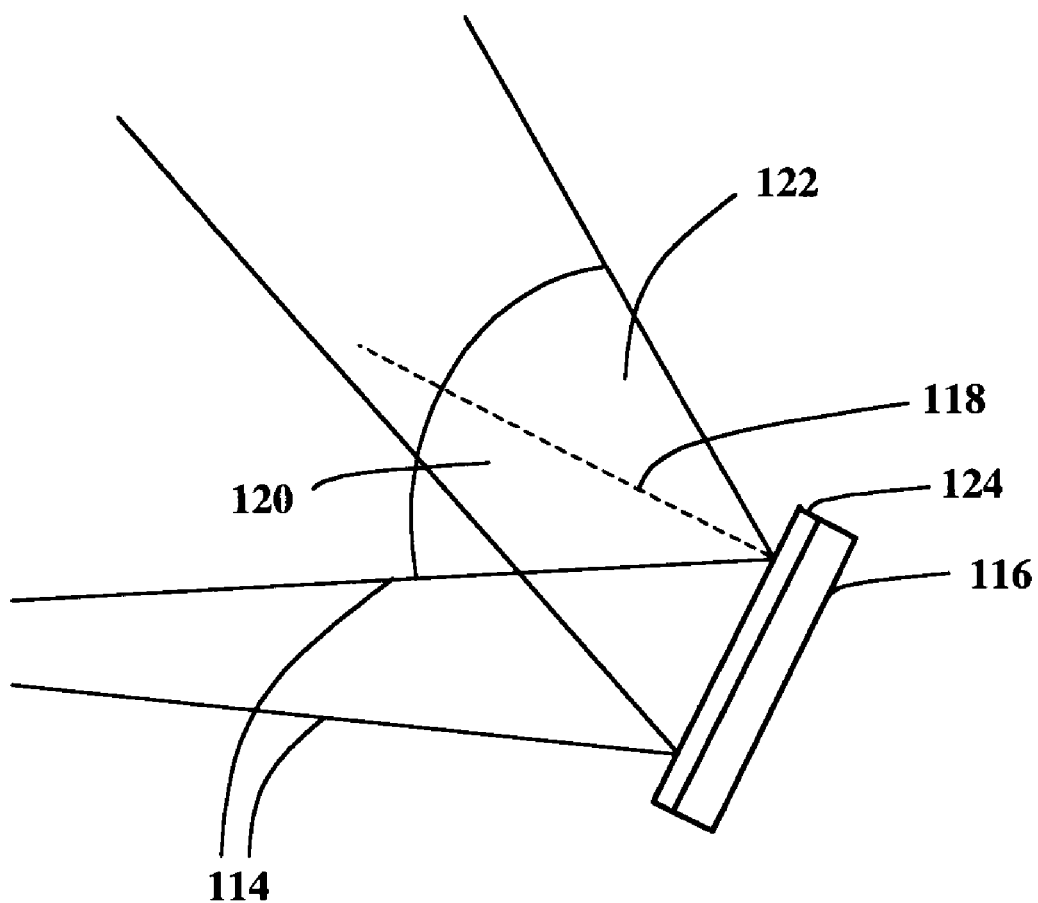
FIG. 3 is a diagram illustrating a side view of one of the planar mirrors of the apparatus in FIG. 1 or FIG. 2.

FIG. 3 illustrates a side view of the first planar mirror 116 in the first optical light path 110. In a preferred embodiment of the invention, the planar mirror 116 includes a UV-enhancing aluminum coating 124. As an example, the model 01-MGF-005/028 planar mirror from Melles-Griot has a UV-enhancing aluminum coating 124. In a preferred embodiment, such UV-enhancing aluminum coatings are used on the other planar mirrors 138, 164, 170, 190 and 196 in the first optical light path 110, the second optical light path 160 and the third optical light path 180.

Figure 4:
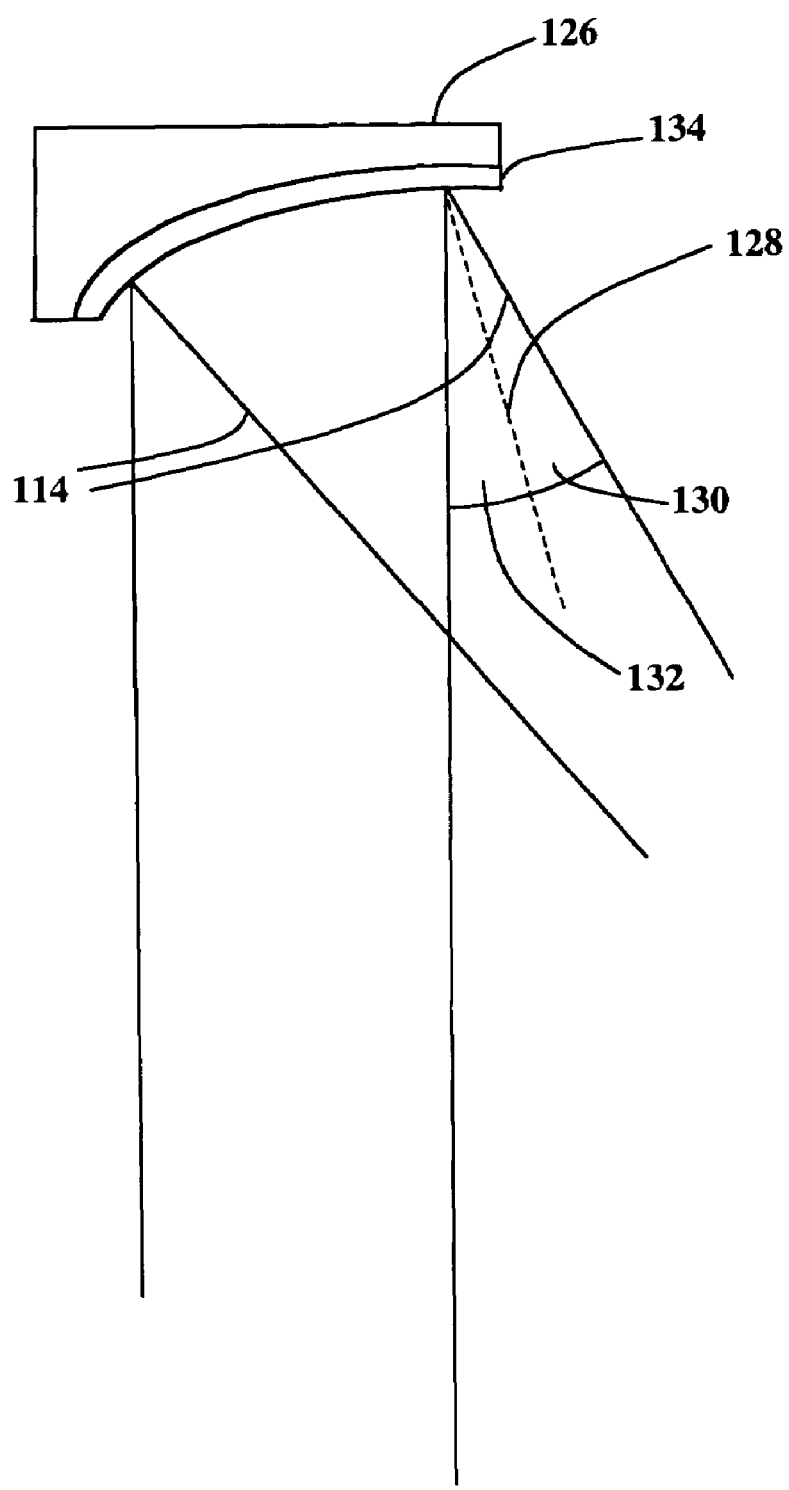
FIG. 4 is a diagram illustrating a side view of one of the off-axis parabolic mirrors of the apparatus in FIG. 1 or FIG. 2.

FIG. 4 illustrates a side view of the first off-axis parabolic mirror 126 in the first optical light path 110. In a preferred embodiment of the invention, the off-axis parabolic mirror 126 includes a UV-enhancing aluminum coating 134. Edmond Industrial Optics is a supplier of such UV-enhanced aluminum coatings. In a preferred embodiment, such UV-enhancing aluminum coatings are used on the other off-axis parabolic mirrors 140, 162, 168, 188 and 194 in the first optical light path 110, the second optical light path 160 and the third optical light path 180.

Figure 2:
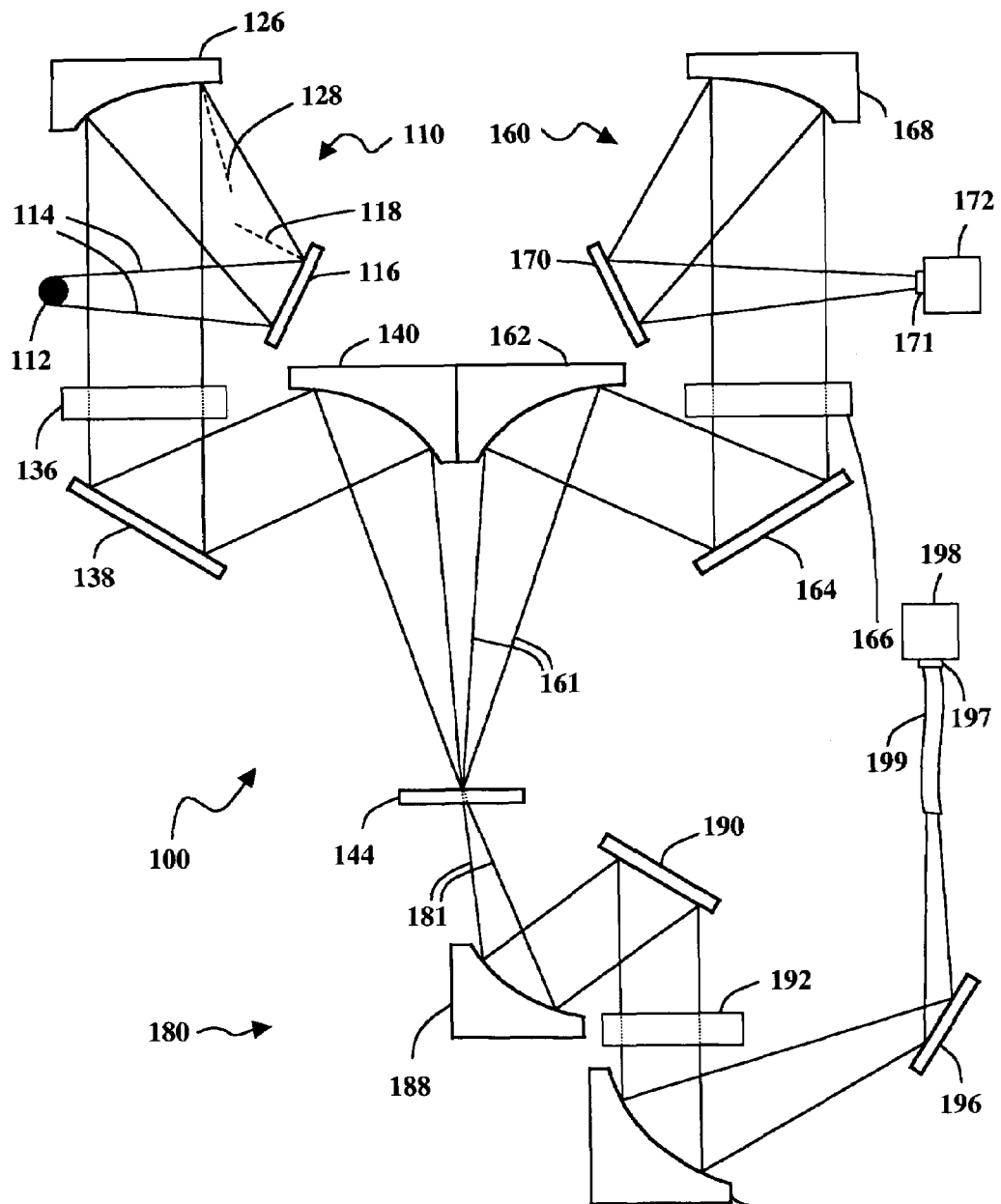
FIG. 2 is a diagram illustrating another embodiment of an apparatus according to the invention.

FIG. 2 illustrates alternate embodiments of the invention. The first optical light path 110 includes a polarizing means 136 for polarizing the broadband beam of light 114 in one of two orthogonal directions. A suitable device is a model PTH-SMP Glan Thompson-type calcite polarizer made by Harrick. The second optical light path 160 includes a polarizing means 166, such as a polarizing analyzer. Once again, the model PTH-SMP Glan Thompson-type calcite polarizer made by Harrick is suitable. The third optical light path 180 includes a polarizing means 192, such as a polarizing analyzer.

In another embodiment of this invention, the third optical light path 180 also includes an optical fiber 199 for redirecting the broadband beam 181 from the third optical light path 180 to the second detector 198.

In another embodiment of this invention, the broadband beam 181 from the third optical light path 180 is redirected and illuminated onto the first detector 172 eliminating the need for the second detector 198. Additional optical components, such as a beam splitter, may be added as is known in the art to ensure that broadband beam 161 and broadband beam 181 are coaxial when they illuminate the first detector 172. A chopper may also be added.

Referring back to FIG. 1, the first detector 172 and the second detector 198 depend on the type of optical characterization to be performed on the sample 144. For measurements of reflected or transmitted intensity as a function of wavelength, the first detector 172 and the second detector 198 with a monochromator, a diode array or a photomultiplier tube is suitable. A monochromator with a 512-element diode array (Model PDA-512) is available from Control Development. A mechanically scanned monochromator is known in the art. A suitable photomultiplier is model R928 from Hamamatsu. For a spectroscopic ellipsometer, a polarization analyzer, such as the model PTH-SMP Glan Thompson-type calcite polarizer made by Harrick, in addition to the monochromator, the diode array or the photomultiplier tube is suitable. In one embodiment, the polarization analyzer can be incorporated in the first detector 172 and the second detector 198. The analysis techniques in U.S. Pat. No. 4,905,170 to Forouhi et al. and U.S. patent application U.S. Ser. No. 10/607,410 to Li et al., hereby incorporated by reference, can be used to determine optical characteristics of the sample 144 from the measurements.

By employing substantially reflective optical components and off-axis parabolic mirrors with collimated incident broadband beam of light 114, reflected broadband beam of light 161, and transmitted broadband beam of light 181, the invention minimizes chromatic aberration in the first light path 110, the second light path 160 and the third light path 180. This enables the small diameter 220 of the broadband beam of light 114 and 161 on the top surface 146 of the sample 144 as well as optical characterization of reflection and transmission properties using the single light source 112. The diameter 220 of the broadband beam of light 114 and 161 is small enough to resolve spatial variations in optical characteristics on the top surface 146 of the sample 144 yet large enough to spatially average the optical characteristics of the sample 144. Artifacts associated with diamond-turned parabolic mirrors are not a concern in this invention since the diameter 220 of the broadband beam of light 114 and 161 on the top surface 146 and the diameter 220 of the broadband beam of light 181 on the bottom surface 148 of the sample 144 are not diffraction limited. The principle impact of such artifacts is scattering of the broadband beam of light 114, 161 and 181, which is not a concern in this invention since these scattered rays will not be illuminated onto the first detector 172 or the second detector 198.

The first, second and third optical light paths 110, 160 and 180 in this invention have been described with parabolic mirrors 126, 140, 162, 168, 188 and 194. One skilled in the art will recognize that other mirror shapes such as a toroidal mirror as well as those based on conic sections, such as elliptical, hyperbolic and spherical, are also suitable. In addition, another reflective surface may be substituted for the planar mirrors 116, 138, 164, 170, 190 and 196.

In view of the above, it will be clear to one skilled in the art that the above embodiments may be altered in many ways without departing from the scope of the invention. Accordingly, the scope of the invention should be determined by the following claims and their legal equivalents.

What is claimed is:

1. An apparatus for characterizing optical properties of a sample, comprising:
    a) a light source for generating a broadband beam;
    b) at least a first set of components defining a first light path, said components including at least a first component pair of a first planar mirror and a first parabolic mirror with a first focal length and a second component pair of a second planar mirror and a second parabolic mirror with a second focal length;
    c) an element onto which said broadband beam is illuminated; and
    d) a means of mechanically displacing said second component pair without altering a position of said second parabolic mirror relative to said second planar mirror, whereby a focus position of said broadband beam can be altered without moving said first component pair;
    wherein said first set of components is disposed between said source and said sample on said first light path.

2. The apparatus of claim 1 wherein said first planar mirror and said first parabolic mirror in said first component pair are positioned such that said broadband beam exiting said first component pair is collimated.

3. The apparatus of claim 1 wherein said second planar mirror and said second parabolic mirror in said second component pair are positioned such that said broadband beam entering said second component pair is collimated.

4. The apparatus of claim 1 wherein said first planar mirror and said first parabolic mirror in said first component pair each has a UV-enhancing aluminum coating.

5. The apparatus of claim 1 wherein said second planar mirror and said second parabolic mirror in said second component pair each has a UV-enhancing aluminum coating.

6. The apparatus of claim 1 wherein said first focal length of said first parabolic mirror in said first component pair is different than said second focal length of said second parabolic mirror in said second component pair.

7. The apparatus of claim 1 wherein said first set of components further comprises a polarizing means.

8. The apparatus of claim 7 wherein said polarizing means polarizes said broadband beam in one of two orthogonal directions.

9. The apparatus of claim 7 wherein said polarizing means further comprises a rotatable polarization analyzer.

10. The apparatus of claim 1 wherein said element is selected from the group consisting of a sample and a first detector.

11. The apparatus of claim 10 further comprising a polarizing means in said first detector.

12. The apparatus of claim 11 wherein said polarizing means further comprises a rotatable polarization analyzer.

13. The apparatus of claim 10 wherein said first detector is a spectroscopic ellipsometer.

14. The apparatus of claim 1 wherein said broadband beam has wavelengths lying in a range between 190 and 1100 nm inclusive.

15. The apparatus of claim 1 wherein said broadband beam has a diameter of greater than 500 µm at said light source and a diameter lying in a range between 50 and 80 µm when illuminated onto a top surface of said sample.

16. The apparatus of claim 1 further comprising a second set of components defining a second light path, wherein said element is a first detector.

17. The apparatus of claim 1 further comprising a third set of components defining a third light path.

18. The apparatus of claim 17
    wherein said third light path includes at least a third component pair of a third planar mirror and a third parabolic mirror with a third focal length and a fourth component pair of a fourth planar mirror and a fourth parabolic mirror with a fourth focal length;
    wherein said third and fourth focal lengths differ from said first and second focal lengths.

19. The apparatus of claim 17 wherein said element is a first detector.

20. The apparatus of claim 17 wherein said element is a second detector.

21. The apparatus of claim 20 further comprising a polarizing means in said second detector.

22. The apparatus of claim 21 wherein said polarizing means further comprises a rotatable polarization analyzer.

23. The apparatus of claim 20 wherein said second detector is a spectroscopic ellipsometer.

24. The apparatus of claim 17 further comprising a fiber for redirecting said broadband beam.

25. A method of characterizing optical properties of a sample comprising:
   a) providing a sample to be characterized;
   b) generating light in a broadband beam;
   c) providing said broadband beam to a top surface of said sample with a first set of reflective components defining a first light path, wherein said first set of components includes at least a first component pair of a first planar mirror and a first parabolic mirror with a first focal length and a second component pair of a second planar mirror and a second parabolic mirror with a second focal length;
   d) adjusting a focus position of said broadband beam by mechanically displacing said second component pair without altering a position of said second parabolic mirror relative to said second planar mirror, whereby the focus position can be altered without moving said first component pair;
   e) receiving a broadband response beam from said sample at a first detector in a second set of reflective components defining a second light path;
   f) measuring an intensity of said broadband response beam from said sample with said first detector; and
   g) determining optical properties of said sample based on said measured intensity, and providing said determined optical properties as an output.

26. The method of claim 25 further comprising polarizing said broadband beam in said first light path in one of two orthogonal directions.

27. The method of claim 25 further comprising focusing said broadband beam illuminating said top surface of said sample in said first light path.

28. The method of claim 25 further comprising focusing said broadband response beam from said sample in said second light path.

29. The method of claim 25 further comprising adjusting polarization of said broadband response beam from said sample in said second light path.

30. The method of claim 25 wherein said broadband beam has wavelengths lying in a range between 190 and 1100 nm inclusive.

31. The method of claim 25 wherein said response beam is emitted from said sample by reflection of said broadband beam from said top surface of said sample, and further comprising:
   h) transmitting said broadband beam through said sample, to a second detector in a third set of reflective components defining a third light path;
   i) measuring an intensity of said transmitted beam with said second detector; and
   j) determining optical properties of said sample based on said intensity of said transmitted broadband beam.

32. The method of claim 25 wherein said response beam is emitted from a bottom surface of said sample by transmission of said broadband beam through said sample.

33. The method of claim 32 further comprising focusing said response beam from said bottom surface of said sample in said second light path.

34. The apparatus of claim 1, further comprising:
   a second set of components defining a second light path, said second set of components including at least a third component pair of a third planar mirror and a third parabolic mirror with a third focal length and a fourth component pair of a fourth planar mirror and a fourth parabolic mirror with a fourth focal length, wherein light propagating between said third component pair and said fourth component pair is substantially collimated;
   a third set of components defining a third light path, said third set of components including at least a fifth component pair of a fifth planar mirror and a fifth parabolic mirror with a fifth focal length and a sixth component pair of a sixth planar mirror and a sixth parabolic mirror with a sixth focal length, wherein light propagating between said fifth component pair and said sixth component pair is substantially collimated;
   wherein said second set of components is disposed between said sample and a first detector on said second light path;
   wherein said third set of components is disposed between said sample and a second detector on said third light path;
   wherein said means provides mechanical displacement of said second component pair, said third component pair, and said fifth component pair together as a unit without altering their relative position.

* * * * *